United States Patent
Kristoffersen et al.

(10) Patent No.: US 7,698,293 B2
(45) Date of Patent: *Apr. 13, 2010

(54) SYSTEM AND METHODS FOR CAPTURING STRUCTURE OF DATA MODELS USING ENTITY PATTERNS

(75) Inventors: Esben Nyhuus Kristoffersen, Dyssegard (DK); Lars Hammer, Fredericksburg (DK); Michael Riddersholm Petersen, Vaerloese (DK); Heinrich Hoffmann Clausen, Gentofte (DK); Thomas Hejlsberg, Hoersholm (DK)

(73) Assignee: Microsoft Corporation, Redmond, WA (US)

( * ) Notice: Subject to any disclaimer, the term of this patent is extended or adjusted under 35 U.S.C. 154(b) by 299 days.

This patent is subject to a terminal disclaimer.

(21) Appl. No.: 11/046,127

(22) Filed: Jan. 28, 2005

(65) Prior Publication Data

US 2006/0173894 A1    Aug. 3, 2006

(51) Int. Cl.
*G06F 7/00* (2006.01)
(52) U.S. Cl. .................................................. 707/102
(58) Field of Classification Search ................ 707/102; 717/105, 104, 108
See application file for complete search history.

(56) References Cited

U.S. PATENT DOCUMENTS

| 6,226,692 B1 * | 5/2001 | Miloushev et al. .......... 719/316 |
|---|---|---|
| 7,089,530 B1 * | 8/2006 | Dardinski et al. ........... 717/105 |
| 2002/0091990 A1 * | 7/2002 | Little et al. ................. 717/105 |
| 2003/0023413 A1 * | 1/2003 | Srinivasa ....................... 703/2 |
| 2004/0181418 A1 * | 9/2004 | Petersen et al. ................ 705/1 |
| 2005/0166193 A1 * | 7/2005 | Smith et al. ................. 717/143 |

FOREIGN PATENT DOCUMENTS

| WO | WO 02/39255 A3 | 5/2002 |
|---|---|---|
| WO | WO 03/042821 A2 | 5/2003 |

OTHER PUBLICATIONS

Florijn, G., Meijers, M., Winsen, P. van. Tool support for object-oriented patterns. Proceedings of ECOOP 1997, pp. 472-495.*

* cited by examiner

*Primary Examiner*—Cheyne D Ly
(74) *Attorney, Agent, or Firm*—Woodcock Washburn LLP

(57) ABSTRACT

A system and method directed to capturing the structure of data models using entity patterns is provided wherein an entity pattern is an abstraction, for example in the MICROSOFT BUSINESS FRAMEWORK® (MBF), that surfaces in the model editor of the framework at the root level and consists of one or more entity roles that together define a structural pattern of a model. The entity pattern may be considered as an über-model, or a model template for a model. Prescriptive rules are added to the design of entities, required properties and relations to other entities (entity roles). Applications of the entity patterns are validated at design time. The runtime framework supports any applied pattern and invokes the pattern specific code. It is a general advantage that the runtime operation is model driven and interprets the model data at runtime. The application and usage of a pattern is part of the model of the application/software program.

11 Claims, 8 Drawing Sheets

SYSTEM AND METHODS FOR CAPTURING STRUCTURE OF DATA MODELS USING ENTITY PATTERNS

CROSS REFERENCE TO RELATED APPLICATIONS

This application is related to the following commonly-assigned patent applications, the entire contents of which are hereby incorporated in this present application by reference: U.S. patent application Ser. No. 10/389,685 entitled "PARAMETERIZED AND REUSABLE IMPLEMENTATIONS OF BUSINESS LOGIC PATTERNS," filed Mar. 12, 2003; U.S. Patent Application No. 60/655,808 entitled "TASK PATTERNS," filed Feb. 13, 2002; International Patent Application No. PCT/DK02/00756 entitled "A METHOD AND SYSTEM FOR CONFIGURATION OF BUSINESS OBJECT TYPES AND BUSINESS OBJECT PATTERNS," filed Nov. 22, 2002; International Patent Application No. PCT/DK01/00740 entitled "AN AUTO-GENERATED TASK SEQUENCE," filed Nov. 9, 2000; and U.S. patent application Ser. No. 09/696,020 entitled "A SYSTEM AND METHODS SUPPORTING CONFIGURABLE OBJECT DEFINITIONS," filed Oct. 26, 2000 and U.S. patent application Ser. No. 11/045,756 entitled "SYSTEM AND METHODS FOR CAPTURING STRUCTURE OF DATA MODELS USING ENTITY PATTERNS," filed Jan. 28, 2005.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © Microsoft Corp.

FIELD OF THE INVENTION

The present invention relates to business frameworks for software development. More specifically, the present invention relates to a framework that enables flexible implementation of logic in applications or computer programs in such a way to express a structural pattern of a data model in a reusable fashion.

BACKGROUND OF THE INVENTION

In creating software for business applications, one must take into consideration that businesses have typically used a variety of mechanisms to control and analyze business operations such as accounting, payroll, human resources, sales orders, employee tracking, customer relations tracking, etc. Tools which provide these functions are often implemented using computer software and may be built using a type of computer automated assistance called a framework or business framework. A software package may provide a user interface in order for a user to easily enter and view data corresponding to the various business operations. The software package is also configured to access and update the data, which is stored in a database.

Business applications are designed to handle various business events, such as order fulfillment and shipment. The business applications include application features that are implemented using code. In addition to code, business applications include a number of abstractions to interact with the code when executing the business applications. The MICROSOFT BUSINESS FRAMEWORK® (MBF), for example, offers a broad range of framework defined abstractions (Entity, Operation, . . . ) to the business developer and a single abstraction (Property Pattern), that allows the business developer to capture business logic for reusability. For example, one abstraction is a business entity that models storing data pertaining to a customer or sales order. These entities (or objects) contain classes for storing data.

Business applications contain many different patterns involving one or more of these entities, i.e., an Entity Pattern. The same pattern is often manually repeated numerous times within the same application and without a way of capturing the pattern. Thus, the original pattern will in practice eventually become blurred. If a developer desires to apply the same pattern again, it is impossible to tell which one of the applications is the original one. If the original patterns change, every application must manually be validated against the pattern and changed accordingly.

In this regard, there is a need for systems and methods that provide developers a way to capture structural patterns consisting of multiple entities and related logic having automatic validation of the entities at design time.

SUMMARY OF THE INVENTION

In consideration of the above-identified shortcomings of the art, the invention provides systems and methods for capturing structural patterns consisting of multiple entities and related logic having validation of the entities at design time as well as providing a runtime framework that supports any applied pattern and invokes the pattern specific code. Developers may declaratively reuse the captured pattern when developing software. It is a general advantage that at runtime the application is model driven and interprets model data at runtime. The application and/or usage of a pattern is part of the model of the application or software program For several embodiments of the present invention, a method for capturing structure of data models is provided comprising creating an Entity Pattern based on at least one entity structure within the data model. An application of the Entity Pattern is validated to ensure the application complies with the Entity Pattern. The process of validation may comprise retaining Entity Pattern information as part of the application of the Entity Pattern and checking whether the application adheres to the entity pattern using said retained entity pattern information.

The Entity Pattern has least one Entity Role for use in checking whether the application adheres to the Entity Pattern. Additionally, this process may include generating a first corresponding class for the Entity Role, the class having a structure described by the Entity Role. The first class allows navigating to other roles of the Entity Pattern at runtime. One way of retrieving metadata that may be hidden from the developer is generating a second corresponding class for the Entity Role containing metadata available at runtime. Other advantages and features of the invention are described below.

BRIEF DESCRIPTION OF THE DRAWINGS

The systems and methods for capturing structure of data models using Entity Patterns in accordance with the invention are further described with reference to the accompanying drawings in which.

DETAILED DESCRIPTION OF ILLUSTRATIVE EMBODIMENTS

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

OVERVIEW

Systems and methods are described for capturing structure of data models using entity patterns. This invention relates to entity patterns which may be implemented, for example, using the MICROSOFT BUSINESS FRAMEWORK® (MBF). However, the present invention, although it may often be described in terms relating to the MBF for exemplary implementation discussion, is not limited to a particular framework and the concepts discussed herein are generally applicable in other development frameworks such as ORACLE APPLICATION DEVELOPMENT FRAMEWORK® (ADF), for example. Entity Patterns as disclosed herein can encompass both structural and functional information about an entity graph and validate this information when applied to concrete applications improving the overall quality and consistency in an application based on entity patterns.

Figure 6:
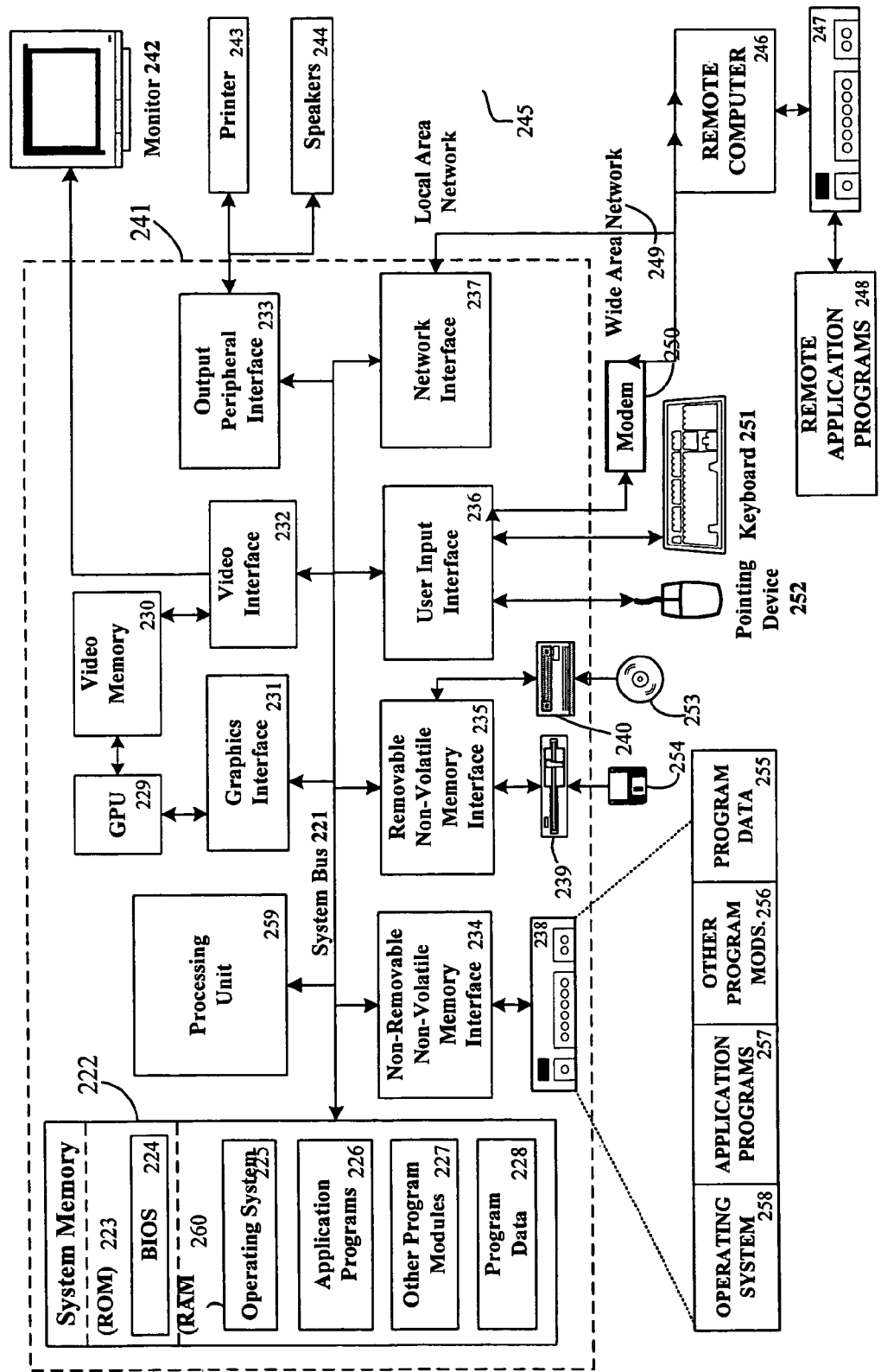
FIG. 6 is a block diagram representing an exemplary computing device suitable for use in conjunction with various aspects of the invention.
Figure 7:
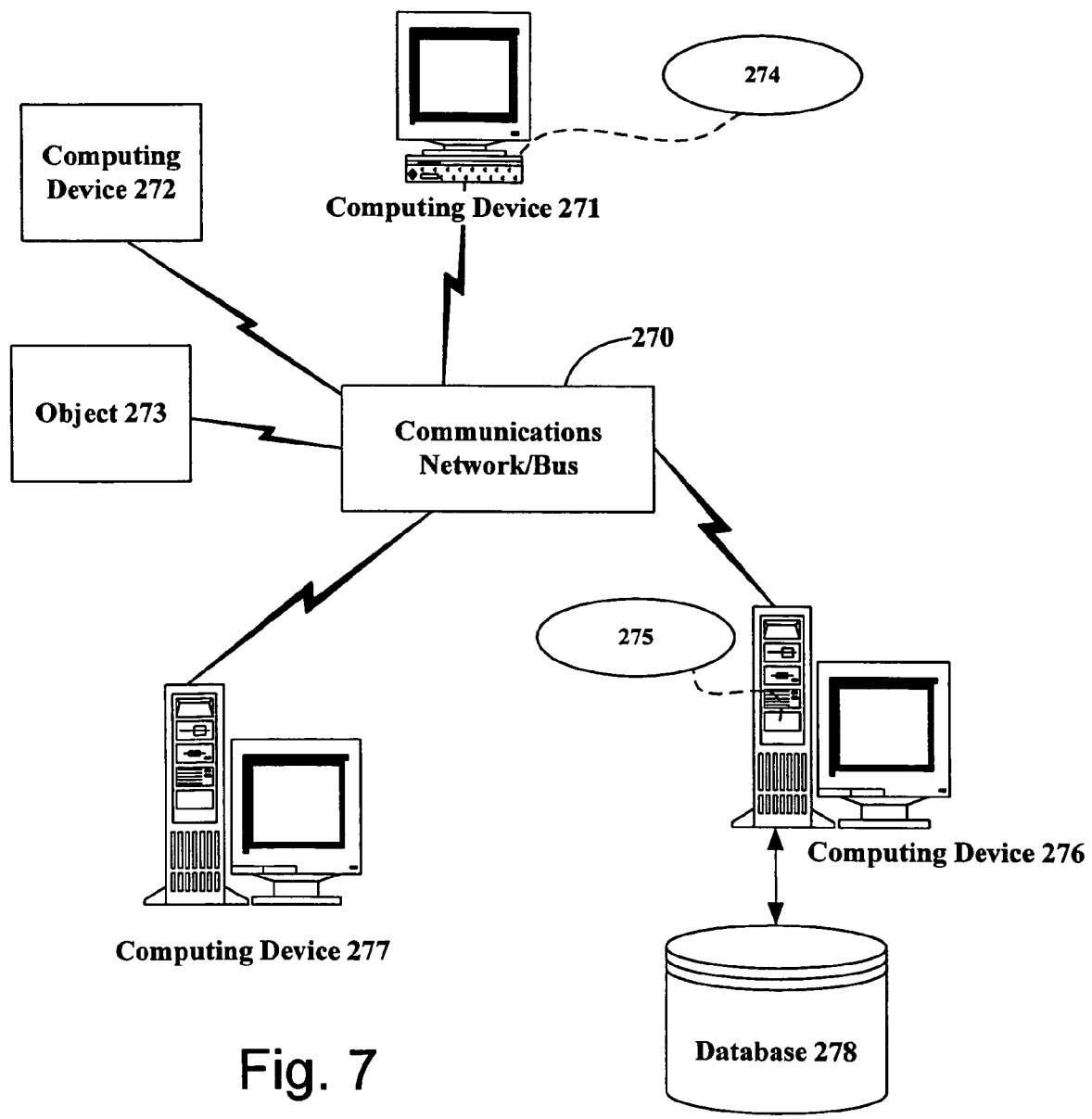
FIG. 7 illustrates an exemplary networked computing environment in which many computerized processes may be implemented.

First, a process of designing Entity Patterns, applying Entity Pattern Roles and validating the applied Entity Pattern Roles will be described followed by a discussion on a programming model for Entity Pattern Roles. Next, the generated code and runtime framework defining the Entity Pattern architecture will be described with sample generated code listings provided. Lastly, FIGS. 6 and 7 provide a computing and networked environment which will be recognized as generally suitable for use in connection with the systems and methods set forth herein. Because the material in FIGS. 6 and 7 is generally for exemplary purposes, the corresponding description is reserved for the end of this specification, in the section entitled "exemplary computing and network environment." A short list of definitions and terms used herein is provided in Appendix A.

Designing Entity Patterns and Applying Entity Pattern Roles

Figure 1:
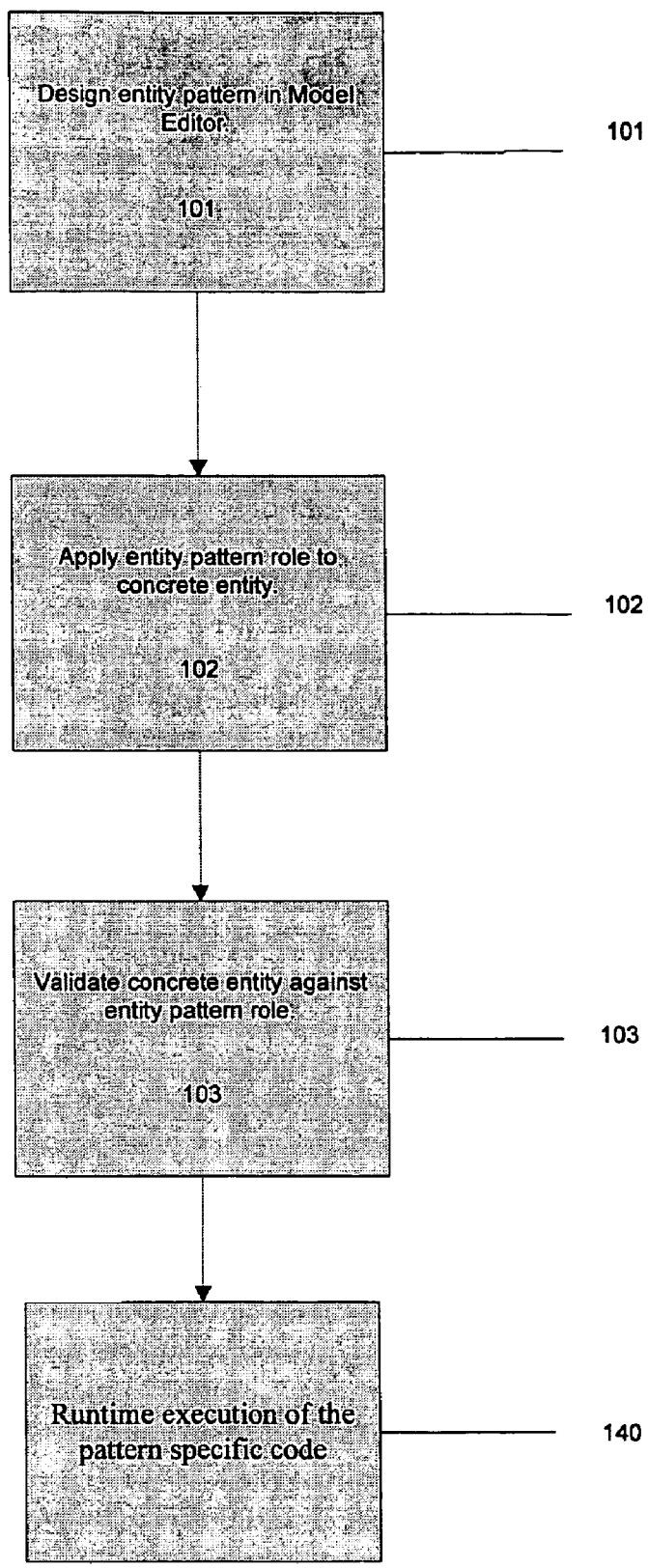
FIG. 1 is a high level view flow chart of a process for creating and using Entity Patterns according to the present invention.

Referring first to FIG. 1, shown is a high level view flow chart of a process for creating and using Entity Patterns according to the present invention. Normally, the use of patterns is only known to the developer, or at best known by a generative wizard. The knowledge of applied patterns is not kept with the application. Entity Patterns retain this knowledge as a part of the application; thus making it possible to revalidate any application's adherence to the applied pattern whenever either the application or the pattern changes.

First, the entity pattern is designed 101 in the MBF Model Editor. Next, the entity pattern role is applied 102 to a concrete entity. Then, the concrete entity is validated 103 against the entity pattern role to ensure it complies with the entity pattern. Entity Patterns are designed within the Model Editor as any other MBF abstraction. A visual designer much like the BED may be used to design an Entity Pattern.

Next, runtime execution of the pattern specific code occurs 140. The runtime framework supports any applied pattern and invokes the pattern specific code. It is a general advantage that the runtime operation is model driven and interprets the model data at runtime and entities can at runtime be queried for applied roles and have an instance of the role class returned. The application and usage of a pattern is part of the model of the application/software program.

Figure 2:
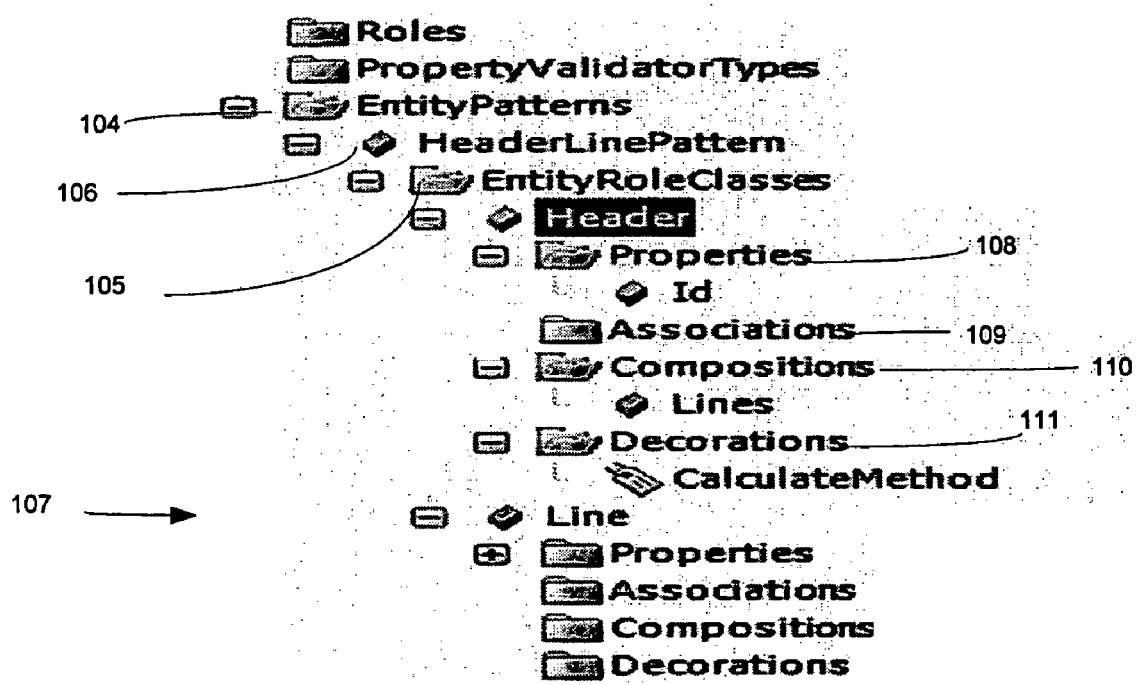
FIG. 2 is a sample screenshot showing exemplary Entity Patterns as they may appear in the Model Editor according to a possible embodiment of the present invention.

Referring next to FIG. 2, shown is a sample screenshot showing exemplary entity patterns 104 as they may appear in the Model Editor 107. Entity Patterns 104 is a top-level element that contains Entity Role Classes 105. Shown as an example is the HeaderLinePattern Entity Pattern 106. Entity Roles follow the same Class (Type)/Instance pattern as Property Patterns. An Entity Role is an instance of an EntityRoleClass 105 in the same way that a Property Pattern is an instance of a Property Pattern Type. As for Property Patterns one might choose to hide this (naming-wise) from the developer by using the term Entity Role for both class and instance in the Model Editor 107. In the following the term Entity Role will be used for both class and instance.

Entity Roles 105 are naturally composed of many of the same model elements as Entities, such as Properties 108, Association 109, Composition 110 and Property Patterns. Most of the elements will have a subset of the same attributes as their concrete counterpart. Regarding Properties 108, the definition of properties on an Entity Role 105 must contain enough information to generate a Entity Role 105 runtime class that exposes the defined properties and maps them using runtime metadata to their corresponding properties on the hosting entity. For example, Accessor, AllowNull, ArrayLength, and Type. With respect to Association 109 and Composition 110, they are at Entity Role 105 level defining relations to other Entity Roles. The relationships specified must be fulfilled when applying Entity Role 105 to actual Entities. Decorations 111 are definitions of metadata that must be specified when an Entity Role 105 is applied to a concrete Entity. The generated Entity Role classes 105 will have properties that wrap this metadata. Decorations are already used for Property Patterns.

The existence of other Entity Roles on the hosting Entity can be defined on an Entity Role 105. This is how inheritance between Entity Roles is described. For example, a Company Entity Role prescribes that a Party Entity Role must also exist on the hosting Entity.

The existence of Property Patterns on the hosting Entity can be defined on an Entity Role 105. As a part of the Apply Entity Role Wizard, explained further below, a choice of mapping or creating defined Property Patterns is offered. Property Pattern roles can be bound within the Entity Pattern 104 by navigating using the properties and relations defined at this level. Roles can also be left "unbound" for the consumer of the Entity Roles 105 to bind them. Finally, the existence of Property Validators can be defined on Entity Role Class properties in the same way that Property Patterns can. Additionally, operations can be designed to work with Entity Roles 105 in the ways that Entities can be used. Also, the generated Entity Role class is partial and can be extended with additional methods and Common Language Runtime (CLR) properties working on the property abstraction defined in the Entity Role Class 105 model element. CLR is a runtime environment that manages the execution of NET program code and provides services such as memory and exception management, debugging and profiling, and security. CLR is a major component of the .NET framework. CLR is also known as the Virtual Execution System (VES).

An Entity Role is applied to an Entity in the Model Editor 107 using drag and drop. The Entity Role 105 is dragged from the Entity Pattern 106 and is dropped onto the EntityRoles folder on the Entity. Right clicking on the Entity Roles node 105 will execute a dialog to pick an Entity Role from the Entity Patterns available in the model.

Figure 3:
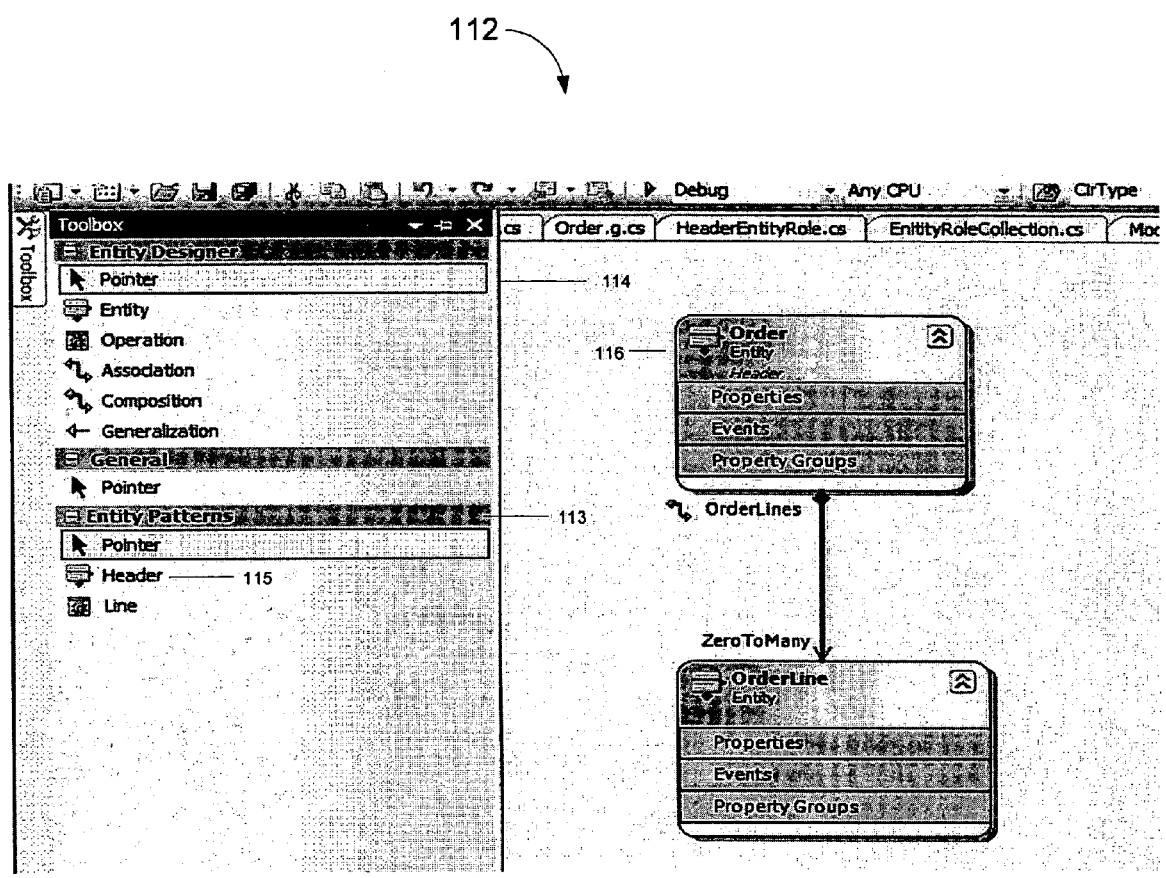
FIG. 3 is a sample screenshot showing an example of the application of Entity Roles using the Business Entity Designer according to a possible embodiment of the present invention.

Referring next to FIG. 3, shown is a sample screenshot illustrating an example of the application of entity roles using the Business Entity Designer (BED) 112 according to the present invention. Entity Roles can be applied using drag and drop in the BED 112. Designed Entity Patterns 113 will surface in the Toolbox 114 as first class citizens. Dragging an Entity Role 115, for example, from the Toolbox 114 and dropping it on an Entity 116 will apply the Entity Role 115. The drop operation might trigger an Entity Role Wizard. The wizard will give the easy user experience for mapping or creating all necessary Property, Association, Composition and other element described for the Entity Role.

Figure 4A:
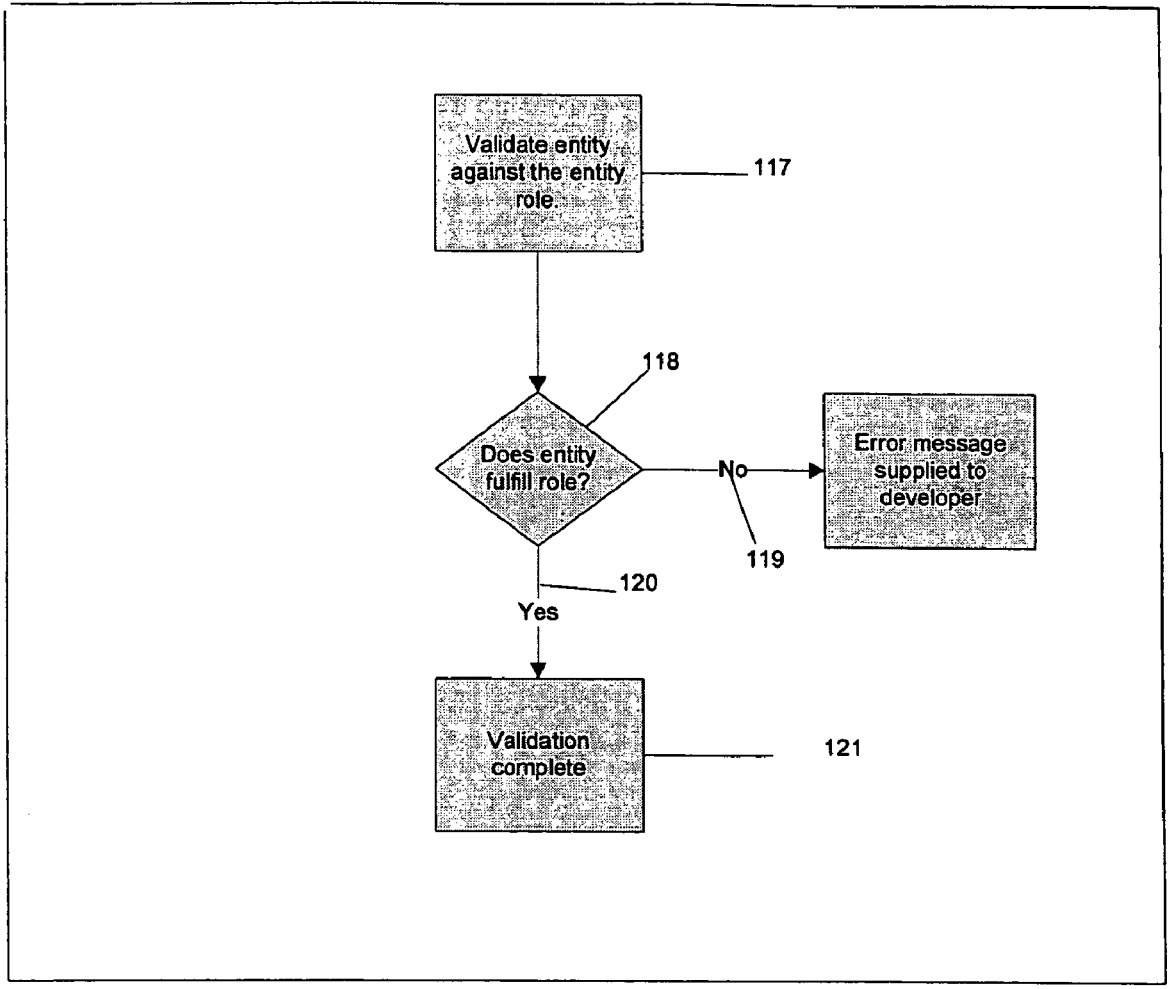
FIG. 4a is a flow chart showing a more detailed view of the processes involved in the block of FIG. 1 corresponding to validating a concrete entity against an Entity Pattern Role according to the present invention.

Referring next to FIG. 4a, shown is a flow chart illustrating a more detailed view of the processes involved in the block of FIG. 1 corresponding to validating a concrete entity against an Entity Pattern Role according to the preset invention. The design of Entities with applied Entity Roles is validated at design-time for conformity to the applied Entity Roles. The prescriptive nature of the Entity Role is implemented by using a Model Validation Engine that validates the entity against the entity role 117 and determines 118 whether the entity fulfills the role. If the entity does not fulfill the role 119, an error message is supplied to the developer. If the applied Entity Roles fail to validate, the model will not be able to compile. If the entity does fulfill the role 120, then the validation is complete 121 and is successful. The Entity Pattern designer may also write explanatory text and embed hyperlinks to additional resources with information to provide the developer with helpful information regarding the Entity Pattern.

An Entity Role can specify relations (Associations & Compositions) to the Entity Role. During model validating, the concrete relationships on the hosting entity is validated for the correct multiplicity and for having the correct Entity Roles applied. Relationships are validated in both directions. In a Header/Line pattern, an entity with the HeaderRole applied must have a composition of an entity with the LineRole applied, but an entity with a LineRole is also validated for being composed by an entity with HeaderRole applied.

Figure 4B:
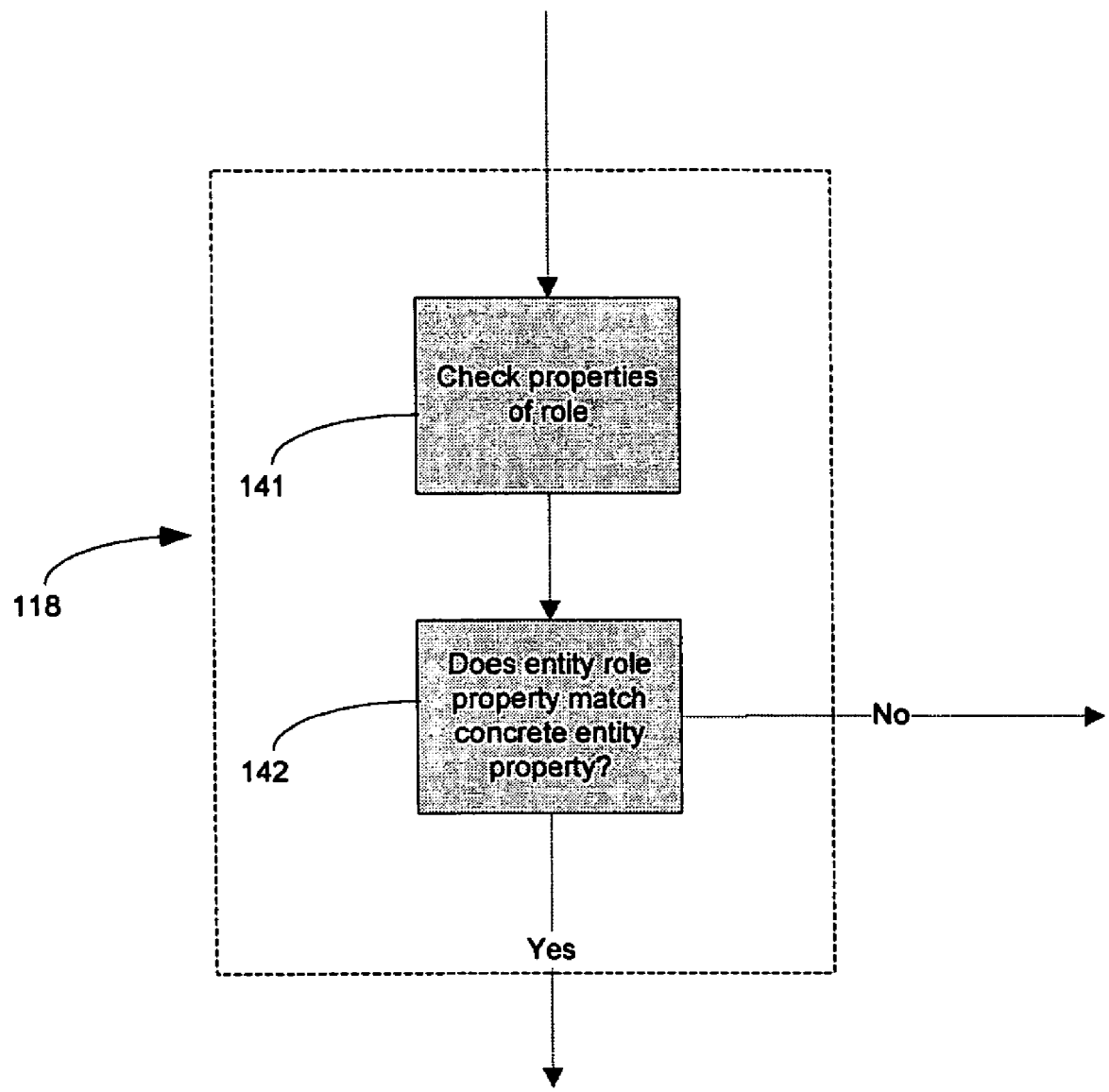
FIG. 4b is a flow chart showing a more detailed view of the processes involved in the block of FIG. 4a corresponding to determining whether an entity fulfills a role according to the present invention.

Referring next to FIG. 4b, shown is a flow chart illustrating a more detailed view of the processes involved in the block of FIG. 4a corresponding to determining whether an entity fulfills a role. Properties will be validated for existence of map between the Entity Role Property and concrete Entity Property. Compliance with the properties set on the Entity Role Property, for example, AllowNull, Type, etc., is also validated. First, the properties of the role are checked 141. Then it is determined whether these properties of the entity role actually match the concrete entity property. If they match, then the validation is complete, otherwise an error message, for example, may be provided to the developer.

Programming Model

Any Entity Role will have a corresponding class with the defined properties and relations. This allows a developer to work with Entity data at the higher Entity Role level. Code written on Entity Roles can work with its own defined properties and the properties on related Entity Roles either directly or indirectly through applied Property Patterns However, the design of Entity Patterns and validation can be used without the particular programming model described herein.

Regarding Entity Roles vs. interfaces, interfaces are used to hide code implementation whereas Entity Roles are hiding different applications of data. Entity Roles can be used to apply a "Marker Interface" Pattern. Entity Roles also have some resemblance to (multiple) inheritance. Some scenarios could be solved using normal inheritance, but Entity Roles will also work with multiple-inheritance scenarios and have an extra mapping-layer sitting between the Entity Role and the underlying Entity. In contrast to multiple-inheritance Entity Roles can be applied declaratively on already compiled entities.

Entity Roles can subscribe to events fired by the concrete application. For example: A customer Entity Role, that defined 3 properties Firstname, Lastname and Fullname, can subscribe to changed events on Firstname and Lastname. When subscribed events are fired on the hosting entity code written in the Entity Role class 123 will be executed.

Queries can be made for Entity types that have a given Entity Role applied. For example, the query could be for all Entities that have the Resource Entity Role applied. This allows for runtime discovery of applied Entity Roles. It is possible to query an instance of an entity for a list of applied roles or for the presence of a specific role. This will give a programming model that resembles the programming model for CLR interfaces.

At first glimpse it may be tempting to represent applied Entity Roles on an Entity using a CLR interface, but this requires recompilation of the Entity and will lead to code like that below, which is undesirable for customization scenarios.

```
Customer customer = Customer.Create( );
if (customer is IParty)
{
    // Do IParty stuff
}
```

Instead, a programming model where the Entity can be queried through a method is implemented as represented by the code below:

```
Customer customer = Customer.Create( );
if (customer.IsEntityRole<PartyEntityRole>( ))
{
    // Do Party stuff
}
```

Similar to the as keyword for interfaces, an Entity can be queried for an instance of a specific Entity Role as represented by the code below:

```
Customer customer = Customer.Create( );
PartyEntityRole party = customer.GetEntityRole<PartyEntityRole>( );
if (party != null)
{
    // Do Party
}
```

Entity Roles can be applied multiple times (each with different mapping), hence support for querying an Entity for a list of a specific Entity Role class is supported as shown below:

```
Customer customer = Customer.Create( );
PartyEntityRole[ ] parties =
    customer.GetEntityRoles<PartyEntityRole>( );
foreach (PartyEntityRole party in parties)
{
    // Go Party
}
```

Retrieving a list of all Entity Roles to an Entity is also supported as shown below:

```
Customer customer = Customer.Create( );
EntityRole[ ] roles = customer.GetEntityRoles( );
foreach (EntityRole role in roles)
{
    // Do stuff
}
```

Generated Code and Runtime Framework

Figure 5:
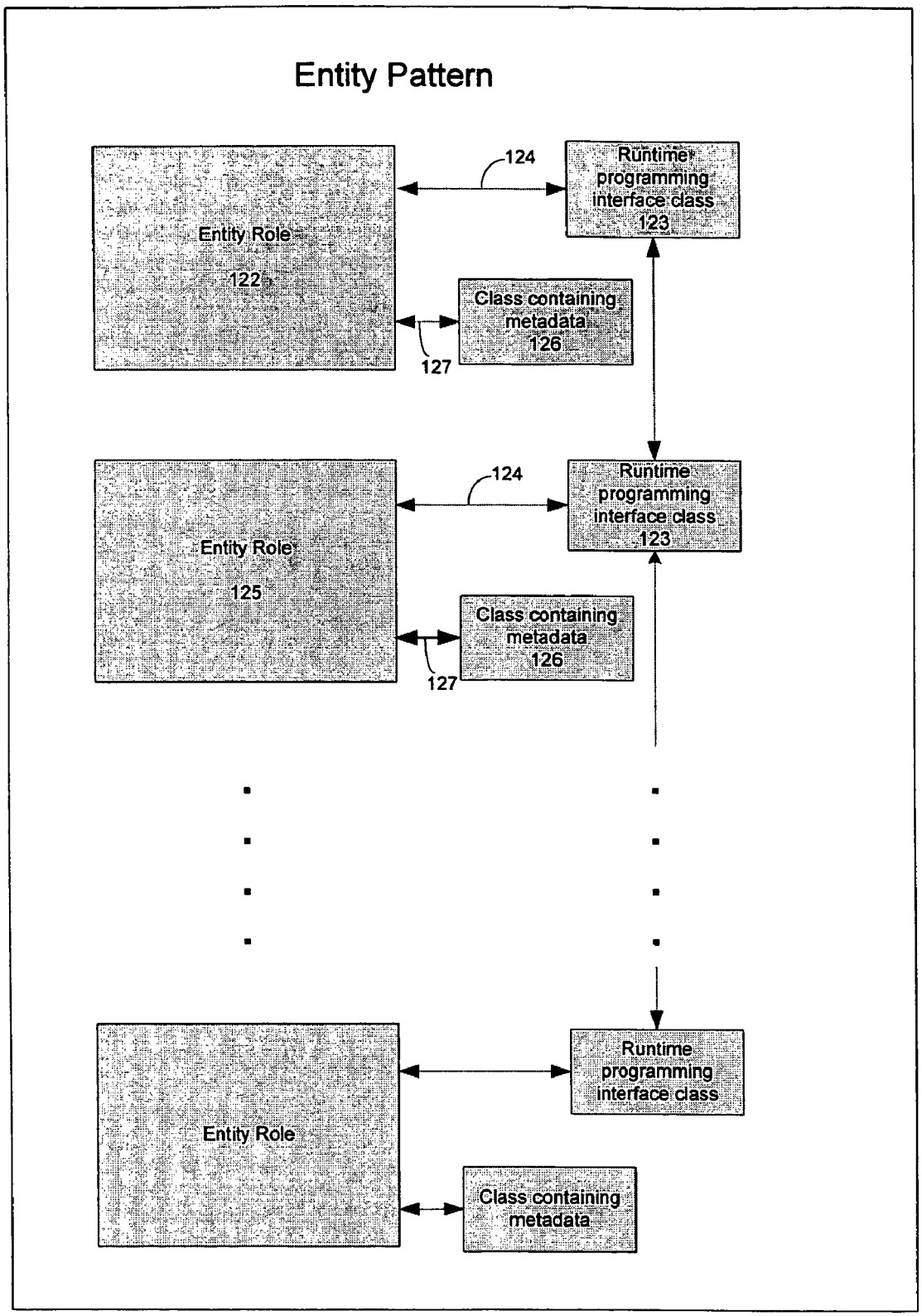
FIG. 5 is a block diagram showing the architecture of the generated code for each Entity Pattern in a possible embodiment.

Referring next to FIG. 5, shown is a block diagram illustrating the architecture of the generated code for each Entity Pattern 113. For each Entity Role 122 within each Entity Pattern 113, two corresponding classes are generated by the framework. One class is the runtime programming interface 123, which has the structure described by the Role and allows navigating 124 to other Roles 125 of the same Pattern 113. The other class 126 contains metadata available at runtime associated 127 with each Role. The above describes how the classes are generated in the framework for one particular embodiment, however, the metadata class 126 could be implemented in different ways (even as a part of class 123). Also, as described above, Entities can at runtime be queried for applied roles and have an instance of the role class returned.

For example, a class (<EntityRoleName>) exposes the defined Properties, Association and Compositions and a class (<EntityRoleName>Info) that contains properties to access the values for the Decorations stored in metadata. The <EntityRoleName>Info class is a runtime class that is populated from metadata-services with Decoration values and data for the mapping between Entity Role Properties, Association and Compositions and their Entity counterparts. For every Decoration specified on the Entity Role class, a CLR property is generated to access the metadata information associated with this Decoration.

For every Property, Association and Composition a string type CLR property with the postfix "Map" is generated in the class. These string properties are generated by the framework to reflect the target property on the hosting Entity class. An example of code generated for the info-class for a Header Entity Role having a SumFormatString decoration, a Sum property and a Lines composition defined is provided below:

```
//-------------------------------------------------------------------------
// <autogenerated>
//     This code was generated by a tool.
//     Runtime Version:2.0.40607.42
//
//     Changes to this file may cause incorrect behavior and will be lost if
//     the code is regenerated.
// </autogenerated>
//-------------------------------------------------------------------------
namespace MyModel {
    using System;
    using System.BusinessFramework;
    using System.BusinessFramework.Entities;
    public class HeaderRoleInfo : EntityRoleInfo {
        private string sumFormatString;
        private string sum;
        private string lines;
        public string SumFormatString {
            get {
                return this.sumFormatString;
            }
            set {
                this.sumFormatString = value;
            }
        }
        public string Sum {
            get {
                return this.sum;
            }
            set {
                this.sum = value;
            }
        }
        public string Lines {
            get {
                return this.lines;
            }
            set {
                this.lines = value;
            }
        }
        public override System.Type GetEntityRoleClass( ) {
            return typeof(HeaderRole);
        }
    }
}
```

Regarding the <EntityRoleName>class that exposes the defined Properties, Association and Compositions, an example of code generated for the runtime class for a Header Entity Role having SumFormatString decoration, a Sum property and a Lines composition defined is provided below:

```
//-----------------------------------------------------------------------
// <autogenerated>
//     This code was generated by a tool.
//     Runtime Version:2.0.40607.42
//
//     Changes to this file may cause incorrect behavior and will be lost if
//     the code is regenerated.
// </autogenerated>
//-----------------------------------------------------------------------
namespace MyModel {
    using System;
    using System.BusinessFramework;
    using System.BusinessFramework.Entities;
    public partial class HeaderRole : EntityRole {
        public HeaderRole(EntityRoleInfo info, Entity entity):
                base(info, entity) {
        }
        public Decimal Sum {
            get {
                return ((Decimal)(GetEntityRoleHost( ).GetProperty(GetInfo( ).Sum).Value));
            }
            set {
                GetEntityRoleHost( ).GetProperty(GetInfo( ).Sum).Value = value;
            }
        }
        public EntityRoleCollection<LineRole> Lines {
            get {
                object value =
GetEntityRoleHost( ).GetType( ).GetProperty(GetInfo( ).Lines).GetValue(GetEntityRoleHost( ), null);
                if ((value == null)) {
                    return null;
                }
                else {
                    return new EntityRoleCollection<LineRole>(((EntityCollection)(value)));
                }
            }
        }
        protected new HeaderRoleInfo GetInfo( ) {
            return ((HeaderRoleInfo)(base.GetInfo( )));
        }
    }
}
```

The runtime framework is implemented with 3 methods the Entity class and some base classes. It is lightweight and has no memory footprint on the Entity class. Also, one may instantiate Entity Roles for each entity, if they subscribes to events. The EntityRole class, for example, is the base class for the runtime representation of the applied Entity Roles. It is abstract with two methods to get the corresponding Entity-RoleInfo object and the hosting entity. A exemplary code listing for the EntityRole class is provided below:

```
namespace System.BusinessFramework.Entities
{
    public abstract class EntityRole
    {
        public EntityRole(System.BusinessFramework.Entities.EntityRoleInfo info, System.BusinessFramework.Entities.Entity entity);

public virtual System.BusinessFramework.Entities.Entity GetEntityRoleHost( );

public System.BusinessFramework.Entities.EntityRoleInfo GetInfo( );
    }
}
```

EntityRoleInfo, for example, is a base-class for runtime metadata information classes, that contains cached information on the mappings extracted from metadata-services. An exemplary code listing for the EntityRoleInfo class is provided below:

```
namespace System.BusinessFramework.Entities
{
    public abstract class EntityRoleInfo
    {
        protected EntityRoleInfo( );
        public abstract System.Type GetEntityRoleClass( );
    }
}
```

The EntityRoleCollection class is a wrapper around EntityCollections allowing access to an EntityCollections at the EntityRole level, while the EntityPatternManager class is responsible for querying metadata-services for applied Entities and instantiate when needed. The EntityPatternManager class will connect to the metadata-service and for every applied Entity Role it will hydrate a corresponding EntityRoleInfo class with necessary mapping information and a corresponding EntityRole class. The Entity base class also has a method to access Entity Roles applied to the Entity. Caching may be used such that the EntityRoleInfo classes are only instantiated at a predetermined rate.

UI Auto-Generated Based on Entity Patterns

The presence of an Entity Pattern retains valuable information that can be leveraged when auto-generating a user interface (UI). The properties and relations modeled as a part of an Entity Role will often be key elements of an entity and may be given predominant positions in a UI.

When showing a Customer entity with an applied PartyRole on a UI with limited space available, the auto-generating mechanism could use the existence of the PartyRole to select the properties to show.

UI layouts can be linked to Entity Patterns and thereby providing consistent UI for concrete entities by inspecting their applied Entity Roles.

Exemplary Computing and Network Environment

Referring to FIG. 6, shown is a block diagram representing an exemplary computing device suitable for use in conjunction with various aspects of the invention. For example, the computer executable instructions that carry out the processes and methods for inline property editing in tree views may reside and/or be executed in such a computing environment as shown in FIG. 6. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220.

Aspects of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the invention may be implemented in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An exemplary system for implementing aspects of the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 6 illustrates operating system 225, application programs 226, other program modules 227, and program data 228.

The computer 241 may also include other removable/non-removable, volatile/nonvolatile computer storage media. By way of example only, FIG. 6 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 6, provide storage of computer readable instructions, data structures, program modules and other data for the computer 241. In FIG. 6, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 6. The logical connections depicted in FIG. 6 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 6 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments refer to utilizing aspects of the invention in the context of one or more stand-alone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

An exemplary networked computing environment is provided in FIG. 7. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 7 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 7, and may itself represent multiple interconnected networks. In accordance with an aspect of the invention, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 7, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 6 and the further diversification that can occur in computing in a network environment such as that of FIG. 7, the systems and methods provided herein cannot be construed as limited in any way to a particular computing architecture. Instead, the invention should not be limited to any single embodiment, but rather should be construed in breadth and scope in accordance with the appended claims.

CONCLUSION

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly. Likewise, the use of synthetic instructions for purposes other than processor virtualization are also anticipated by the disclosures made herein, and any such utilization of synthetic instructions in contexts other than processor virtualization should be most broadly read into the disclosures made herein.

APPENDIX A: Definitions and terms

| | |
|---|---|
| REA | Resources, Events and Agent - an established ontology for the business domain. |
| Entity Pattern | A conceptual pattern consisting of one or more entity roles. The Header-Line pattern described herein is an example of an Entity Pattern. |
| Entity Role Class | Describes required properties and relations to other Entity Roles. In the Header-Line pattern will consist of a Header Entity Role that demands a composition to an Entity with the Line Entity Role applied. Entity Role will be used interchangeably with Entity Role Class for many purposes. |
| Entity Role | The instance of an applied Entity Role Class. |
| BED | Business Entity Designer - visual design surface used to design entities. |
| Hosting Entity | The Entity that an Entity Role is applied to. |
| Entity Type Category | Original/former term used for an Entity Role. |
| Property Patterns | MBF implementation of the PARAMETERIZED AND REUSABLE IMPLEMENTATIONS OF BUSINESS LOGIC PATTERNS patent. |

What is claimed:

1. A computer-implemented method for capturing structure of data models in a computer system comprising a processor and a memory, the method comprising:

automatically creating by the processor an entity pattern based on at least one entity structure within a data model, wherein the entity pattern is used in checking whether an application executing on the processor adheres to the entity pattern, and wherein the entity pattern comprises a plurality of entity roles, each entity role describing properties of the entity role and any relations to other entity roles of the entity pattern;

applying by the processor a first entity role to a first hosting entity of the application, the first entity role describing a relation to a second entity role;

applying by the processor the second entity role to a second hosting entity of the application, the second entity role describing its relation to the first entity role; and validating by the processor said application of the first and second entity roles to the first and second hosting entities of the application, wherein said validating comprises:

ensuring that properties of each entity role map to properties of the hosting entities to which they are applied; and ensuring that the first hosting entity is properly related to the second hosting entity as described by the first entity role, and ensuring that the second entity role is properly related to the first hosting entity as described in the second entity role, such that the relationships are validated in both directions.

2. The method of claim 1, further comprising:

generating a corresponding class for each entity role, the class having a structure described by the entity role, and wherein the class allows navigating to other roles of the entity pattern.

3. The method of claim 1, wherein the act of creating an entity pattern comprises:

generating a declaratively applied programming model as part of designing the entity pattern; and in conjunction with the programming model, writing software code defining the entity pattern without requiring knowledge of an application of the entity pattern.

4. The method of claim 3, further comprising including declaratively applied functionality in the entity pattern.

5. A computer readable storage medium having stored thereon instructions for performing a method for capturing structure of data models comprising:

automatically creating an entity pattern based on at least one entity structure within a data model, wherein the entity pattern is used in checking whether an application adheres to the entity pattern, and wherein the entity pattern comprises a plurality of entity roles, each entity role describing properties of the entity role and any relations to other entity roles of the entity pattern;

applying a first entity role to a first hosting entity of the application, the first entity role describing a relation to a second entity role;

applying the second entity role to a second hosting entity of the application, the second entity role describing its relation to the first entity role; and validating said application of the first and second entity roles to the first and second hosting entities of the application, wherein said validating comprises:

ensuring that properties of each entity role map to properties of the hosting entities to which they are applied; and ensuring that the first hosting entity is properly related to the second hosting entity as described by the first entity role, and ensuring that the second entity role is properly related to the first hosting entity as described in the second entity role, such that the relationships are validated in both directions.

6. The computer readable storage medium of claim 5 further comprising instructions stored thereon for:

generating a corresponding class for each entity role, the class having a structure described by the entity role, and wherein the class allows navigating to other roles of the entity pattern.

7. The computer readable storage medium of claim 5, wherein the act of creating an entity pattern comprises:
   generating a declaratively applied programming model as part of designing the entity pattern; and
   in conjunction with the programming model, creating software code defining the entity pattern without requiring knowledge of an application of the entity pattern.

8. The computer readable storage medium of claim 7, further comprising instructions stored thereon for including declaratively applied functionality in the entity pattern.

9. A computer system for capturing structure of data models comprising
   a processor;
   a memory;
   means executing on the processor for automatically creating an entity pattern based on at least one entity structure within a data model, wherein the entity pattern is used in checking whether an application adheres to the entity pattern, and wherein the entity pattern comprises a plurality of entity roles, each entity role describing properties of the entity role and any relations to other entity roles of the entity pattern;
   means executing on the processor for applying a first entity role to a first hosting entity of the application, the first entity role describing a relation to a second entity role;
   means executing on the processor for applying the second entity role to a second hosting entity of the application, the second entity role describing its relation to the first entity role; and
   means executing on the processor for validating said application of the first and second entity roles to the first and second hosting entities of the application, wherein said validating comprises:
      ensuring that properties of each entity role map to properties of the hosting entities to which they are applied; and
      ensuring that the first hosting entity is properly related to the second hosting entity as described by the first entity role, and ensuring that the second entity role is properly related to the first hosting entity as described in the second entity role, such that the relationships are validated in both directions.

10. The computer system of claim 9, further comprising:
    means executing on the processor for generating a corresponding class for each entity role, the class having a structure described by the entity role, and wherein the class allows navigating to other roles of the entity pattern.

11. The computer system of claim 9, wherein the means for creating an entity pattern comprises:
    means executing on the processor for generating a declaratively applied programming model as part of designing the entity pattern; and
    in conjunction with the programming model, means executing on the processor for writing software code defining the entity pattern without requiring knowledge of an application of the entity pattern.

* * * * *